(12) United States Patent
Lee et al.

(10) Patent No.: US 10,146,336 B2
(45) Date of Patent: Dec. 4, 2018

(54) TOUCH SCREEN DEVICE (71) Applicant: Samsung Electronics Co., Ltd, Gyeonggi-do (KR)

(72) Inventors: Joo-Hoon Lee, Gyeonggi-do (KR); Se-Jin Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 299 days.

(21) Appl. No.: 14/014,080

(22) Filed: Aug. 29, 2013

(65) Prior Publication Data
US 2014/0062948 A1  Mar. 6, 2014

(30) Foreign Application Priority Data
Aug. 29, 2012  (KR) .................. 10-2012-0095222

(51) Int. Cl.
*G06F 3/0354* (2013.01)
*G06F 3/041* (2006.01)
*G06F 3/046* (2006.01)

(52) U.S. Cl.
CPC .......... *G06F 3/03545* (2013.01); *G06F 3/046* (2013.01); *G06F 3/0418* (2013.01)

(58) Field of Classification Search
CPC ........ G06F 3/0354; G06F 3/041; G06F 3/046; G06F 3/03545; G06F 3/0418
USPC .................................. 345/21, 173-174, 179
See application file for complete search history.

(56) References Cited

U.S. PATENT DOCUMENTS

| 8,183,476 | B2 | 5/2012 | Fukushima et al. |
| 9,678,604 | B2 | 6/2017 | Lee |
| 2003/0122795 | A1* | 7/2003 | Fujitsuka ............ G06F 3/03545 345/173 |
| 2004/0239642 | A1 | 12/2004 | Shi et al. |
| 2006/0267580 | A1 | 11/2006 | Fukushima et al. |
| 2008/0264699 | A1 | 10/2008 | Chang et al. |
| 2009/0002928 | A1 | 1/2009 | Murakami |

(Continued)

FOREIGN PATENT DOCUMENTS

| CN | 2504706 | 8/2002 |
| DE | 102009050554 A1 | 4/2010 |

(Continued)

OTHER PUBLICATIONS

International Search Report dated Nov. 21, 2013 in connection with International Patent Application No. PCT/KR2013/007730, 3 pages.

(Continued)

*Primary Examiner* — Amare Mengistu
*Assistant Examiner* — Gloryvid Figueroa-Gibson (57) ABSTRACT

Provided is a touch screen device which includes an Electromagnetic Resonance (EMR) sensing panel for sensing, an input from an electronic pen, a display panel that is installed on a top layer portion of the EMR sensing panel, configured to receive a control signal or graphic signal from outside, and displays a corresponding image, a bracket that is formed in the form of a plate beneath the EMR sensing panel and the display panel and has an extension portion that extends from the corresponding portions of the EMR sensing panel and the display panel, and a frequency compensating plate that is formed of a soft magnet installed on the extension portion.

11 Claims, 4 Drawing Sheets

(56) References Cited

U.S. PATENT DOCUMENTS

| | | | |
|---|---|---|---|
| 2010/0328249 A1* | 12/2010 | Ningrat | G06F 3/046 345/174 |
| 2012/0007824 A1 | 1/2012 | Mi | |
| 2012/0025354 A1 | 2/2012 | Sasaki et al. | |
| 2012/0162127 A1* | 6/2012 | Onoda | G06F 3/0412 345/174 |
| 2012/0169663 A1 | 7/2012 | Kim et al. | |
| 2012/0306824 A1* | 12/2012 | Horie | G06F 3/03545 345/179 |
| 2014/0146004 A1* | 5/2014 | Jang | G06F 1/1698 345/174 |

FOREIGN PATENT DOCUMENTS

| | | |
|---|---|---|
| EP | 1437643 A1 | 7/2004 |
| EP | 2474889 A2 | 7/2012 |
| EP | 2474889 A3 | 7/2012 |
| JP | 4799040 B2 | 10/2011 |
| KR | 10-2012-0031797 | 4/2012 |
| KR | 10-2012-0079595 | 7/2012 |
| KR | 10-2012-0079598 A | 7/2012 |
| RU | 2399949 C1 | 9/2010 |
| WO | WO 2012/051146 A1 | 4/2012 |

OTHER PUBLICATIONS

Written Opinion of the International Searching Authority dated Nov. 21, 2013 in connection with International Patent Application No. PCT/KR2013/007730, 5 pages.

First Office Action dated Sep. 6, 2016 in connection with Chinese Application No. 201380045261.9, 15 pages.

Extended European Search Report dated May 18, 2016 in connection with European Application No. 13182050.8, 8 pages.

Russian Office Action for Russian Application No. 2015110706, dated Jul. 28, 2017. (8 pages).

Office Action dated Jul. 12, 2018 in connection with Korean Patent Application No. 10-2012-0095222.

* cited by examiner

TOUCH SCREEN DEVICE

CROSS-REFERENCE TO RELATED APPLICATION(S) AND CLAIM OF PRIORITY

The present application is related to and claims the priority under 35 U.S.C. § 119(a) to Korean Patent Application Serial No. 10-2012-0095222, which was filed in the Korean Intellectual Property Office on Aug. 29, 2012, the entire disclosure of which is hereby incorporated by reference.

TECHNICAL FIELD

The present disclosure generally relates to a touch screen input scheme, and more particularly, to an apparatus for compensating for distortion of an input sensing signal in a touch screen device using an electronic pen such as a stylus pen.

BACKGROUND

Recent display devices mostly adopt touch screen input schemes in which users perform input operations by directly touching a screen with fingers or electronic pens. Such touch screen input schemes are mainly used in portable terminals such as smart phones, cellular phones, notebook computers, all-in-one Personal Computers (PCs), tablet PCs, and Portable Multimedia Players (PMPs). In the touch screen input schemes, an intuitive and convenient user interface, instead of a keyboard, a mouse, or a physical button, can be provided as an input means for inputting position information indicated by a user by the user touching a particular position on a display screen. In particular, a touch input scheme using a pen is effective for more precise coordinate designation than a touch input scheme using a finger, and thus is suitable for a graphic task such as Computer-Aided Design (CAD).

Such a touch screen input scheme is also called a digitizer or an Electric Graphic Input Panel (EGIP), and can be classified into a resistive type, a capacitive type, an Electro Magnetic Resonance (EMR) type (or electromagnetic type) depending on a way to detect a position indicated by a user.

The resistive type senses a position pressed by a pressure in a state where a Direct Current (DC) voltage is applied, based on a change of the amount of current, in which contact between two thin conductive layers on a screen by a pressure applied by a finger or an electronic pen such as a stylus pen is sensed.

The capacitive type performs sensing by using capacitance coupling in a state where an Alternative Current (AC) voltage is applied, in which a sensing target needs to be a conductor and a contact area larger than a predetermined area is required to apply a change of a capacitance which can be sensed.

The EMR type uses a so-called digitizer sensor board having loop coil arrangement. Thus, when the user moves the electronic pen, the electronic pen is driven by an AC signal to generate a resonating magnetic field, and the resonating magnetic field induces a signal in a coil of the digitizer sensor board, such that a position of the electronic pen is detected by the signal induced in the coil.

The EMR type recognizes the position of the pen by mounting multiple coils in the board and sensing an electromagnetic change occurring by the approach of the pen. As a result, unlike in the resistive type, the sensor board is not necessarily disposed on a front side of a display module and it can also be mounted on a rear side of the display module. Thus, a multi-input device is also provided which enables an EMR-type digitizer (touch) input device and a capacitive-type touch input device for sensing a user's finger touch at the same time.

An example of a touch screen input scheme is disclosed in Korean Patent Publication No. 10-2012-0079595 filed by the present applicant, invented by Kwan-hyoung Kim and Ju-hoon Lee, published on Jul. 13, 2012, and titled "Method and Apparatus for Correcting Input Error of Input Device".

In various portable terminals, structures for mounting a touch screen, a battery, and various circuits are disposed, and they can be causes for interruption or disturbance of a magnetic field, especially in the EMR-type touch screen. As a result, distortion of an input sensing signal through the touch screen occurs, negatively affecting the performance of the touch screen.

SUMMARY

To address the above-discussed deficiencies of the prior art, it is a primary object to provide a touch screen device having a structure for compensating for distortion of an input sensing signal.

Another aspect of the present disclosure is to provide a touch screen device having a structure for compensating for distortion of an input sensing signal, such that an input can be more accurately sensed.

According to an aspect of the present disclosure, there is provided a touch screen device which includes an Electromagnetic Resonance (EMR) sensing panel for sensing an input from an electronic pen, a display panel that is installed on a top layer portion of the EMR sensing panel, receives a control signal or graphic signal from outside, and displays a corresponding image, a bracket that is formed in the form of a plate on corresponding portions of the EMR sensing panel and the display panel and has an extension portion that extends from the corresponding portions of the EMR sensing panel and the display panel, and a frequency compensating plate that is formed of a soft magnet installed on the extension portion.

Preferably, the extension portion can be formed on at least one of upper, lower, and edge portions of the bracket.

According to another aspect of the present disclosure, there is provided a touch screen device which includes an Electromagnetic Resonance (EMR) sensing panel for sensing an input from an electronic pen, a display panel that is installed on a top layer portion of the EMR sensing panel, receives a control signal or graphic signal from outside, and displays a corresponding image, a bracket that is formed in the form of a plate on corresponding portions of the EMR sensing panel and the display panel and has an extension portion that extends from the corresponding portions of the EMR sensing panel and the display panel in such a way not to protrude toward the EMR sensing panel and the display panel, and an insulator installed on the extension portion to allow other parts to be additionally installed.

Preferably, the insulator can be installed to extend from the extension portion toward the sides of the EMR sensing panel and the display panel, thus to support the sides of the EMR sensing panel and the display panel.

Preferably, a sidewall structure that protrudes downwardly from a side of the plate can be integrally provided in the bracket.

Before undertaking the DETAILED DESCRIPTION OF THE DISCLOSURE below, it may be advantageous to set forth definitions of certain words and phrases used throughout this patent document: the terms "include" and "comprise," as well as derivatives thereof, mean inclusion without limitation; the term "or," is inclusive, meaning, and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged electronic devices. Hereinafter, exemplary embodiments of the present disclosure will be described in detail with reference to the accompanying drawings. In the following description, specific details such as detailed components are provided to assist overall understanding of the present disclosure, and it is obvious to those of ordinary skill in the art that various changes or modifications can be made in the specific details within the scope of the present disclosure.

Figure 1:
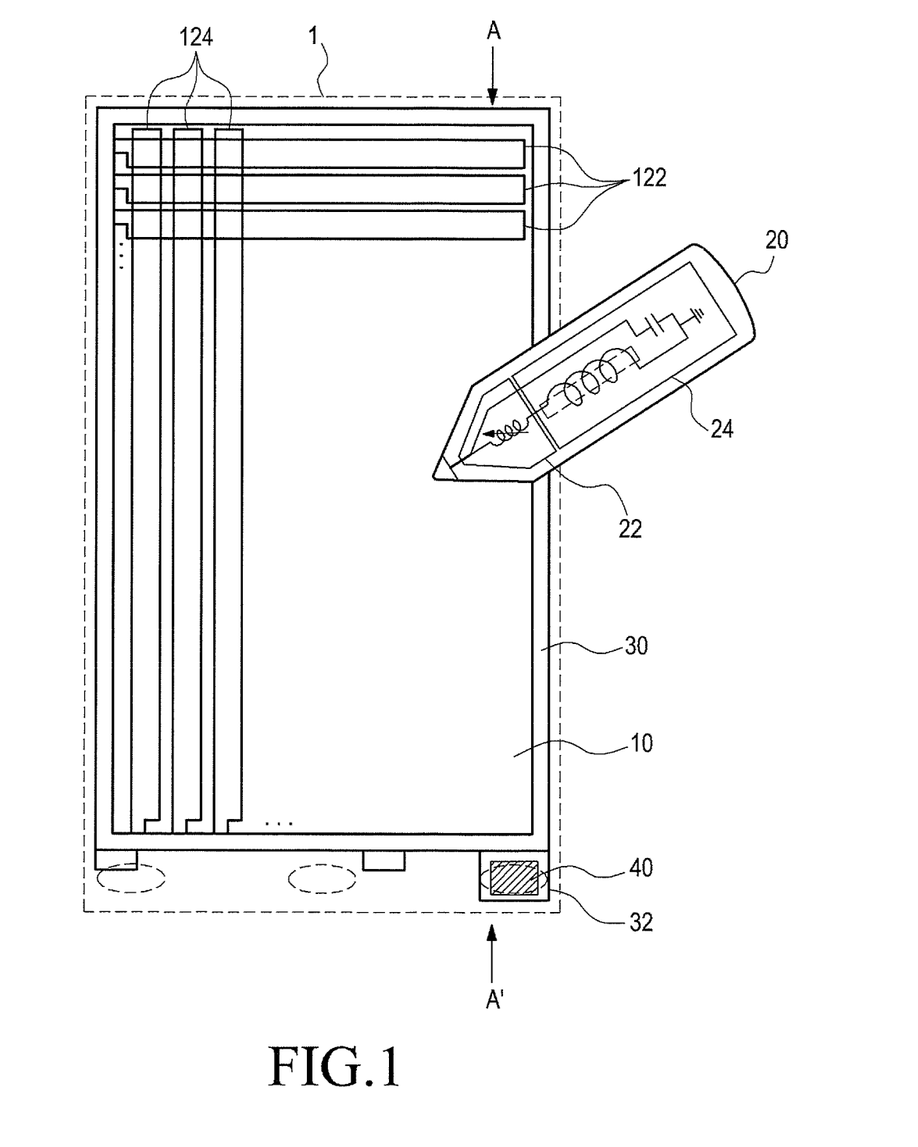
FIG. 1 is a floor plan illustrating a touch screen device having a structure for compensating for distortion of an input signal and an electronic pen according to one embodiment of the present disclosure.

FIG. 1 is a floor plan illustrating a touch screen device having a structure for compensating for distortion of an input signal and an electronic pen according to one embodiment of the present disclosure, in which for convenience, a structure or size is simplified or exaggerated. In the present disclosure, a touch screen device has an EMR-based structure. The touch screen according to the present disclosure illustrated in FIG. 1 can be applied to a portable terminal 1, and includes an EMR sensing panel 10 for sensing a contact and non-contact proximity (hovering) input from an electronic pen 20 such as a stylus pen.

The EMR sensing panel 10 is also referred to as a digitizer sensor board, in which multiple loop coil patterns 122 and 124 which each generate a magnetic field of a preset resonance frequency with the electronic pen 20 are substantially orthogonal to each other along a horizontal axis and a vertical axis. The horizontal-axis loop coil patterns 122 can be formed to partially overlap with each other, and the vertical-axis loop coil patterns 124 can also be formed to partially overlap with each other. In the EMR sensing panel 10, as the multiple loop coil patterns 122 and 124 are sequentially selected, they repeat an AC power applying operation of a resonance frequency for forming a magnetic field and a magnetic field detecting operation of a resonance frequency formed in the electronic pen 120.

The electronic pen 20 for inputting coordinates on the EMR sensing panel 10 includes an LC resonance circuit including an inductor (coil) and a capacitor as a main resonance circuit 24. The coil generates current with a magnetic field formed on the EMR sensing panel 10, and delivers the generated current to the capacitor. Thus, the capacitor is charged with current inputted from the coil, and discharges the charged current through the coil. Eventually, the magnetic field of a resonance frequency is emitted to the coil.

The magnetic field emitted by the electronic pen 20 can be absorbed again by the multiple loop coils 122 and 124 of the EMR sensing panel 10, such that it can be determined at which position on the touch screen the electronic pen 20 is located. More specifically, if the user brings the electronic pen 20 in proximity to a particular portion of the touch screen in a contact or hovering manner, each of the multiple loop coils 122 and 124 senses a magnetic field generated from the electronic pen 20 and outputs the correspondingly induced current as a sensing signal. Each of the multiple loop coils 122 and 124 outputs a sensing signal having higher signal strength as it is in proximity to the electronic pen 20, recognizes the sensing signal, and identifies an accurate position of the electronic pen 20.

To generate another signal according to a contact or hovering state on the touch screen, the electronic pen 20 includes a variable resonance circuit 22 which changes the resonance frequency of the main resonance circuit 24. The variable resonance circuit 22 can be implemented with a variable inductor component having an inductance value that varies with a contact pressure like when a tip of the electronic pen 20 contacts the touch screen, or with a variable capacitor component having a capacitance value that varies with the contact pressure. The variable values of the variable inductor component and the variable capacitor component can be set to relatively fine values.

In the electronic pen 20, due to the variable resonance circuit 22, there is a difference in resonance frequency generated in the main resonance circuit 24 according to a contact or hovering state, and the EMR sensing panel 10 senses such a resonance frequency difference, such that the electronic pen 20 can determine whether it is in a contact or hovering state with respect to the touch screen.

The EMR sensing panel 10 can include a magnetic field shielding layer (not shown) thereunder.

The touch screen including a display panel such as an Active Matrix Organic Light Emitting Diode (AMOLED) as well as the EMR sensing panel 10 can be mounted on a bracket 30 for protecting the touch screen from external shocks and firmly holding the touch screen. The bracket 30 is configured in a proper form for protecting other circuits, equipments, and exterior case of the portable terminal 1 from external shocks.

The bracket 30 can have a large-area extension portion 32 which extends from an installation portion of the EMR sensing panel 10 to protect upper and lower portions, especially the bottom portion, of the portable terminal 1. The extension portion 32 is provided to install therein a hard key having a typical press key structure or a soft key having a touch input structure provided in the portable terminal 1 or protect a portion for installation of, for example, a microphone from external pressure or shock.

The bracket 30 is formed of a magnesium material, aluminum or tungsten to satisfy required strength while having light weight. As such, the bracket 30 is formed of a non-magnetic conductor, such that when the electronic pen 20 is located in proximity to the extension portion 32, the magnetic field of the electronic pen 20 is affected by the extension portion 32 and the resonance frequency generated in the electronic pen 20 is changed, thus failing to generate an accurate input sensing signal.

To prevent this problem, in one embodiment of the present disclosure, a frequency compensating plate 40 formed of a soft magnet is installed on the extension portion 32, thereby compensating for an influence of the extension portion 32 upon the magnetic field. Such an operation principle will be described in more detail with reference to FIGS. 2 and 3.

Figure 2A:
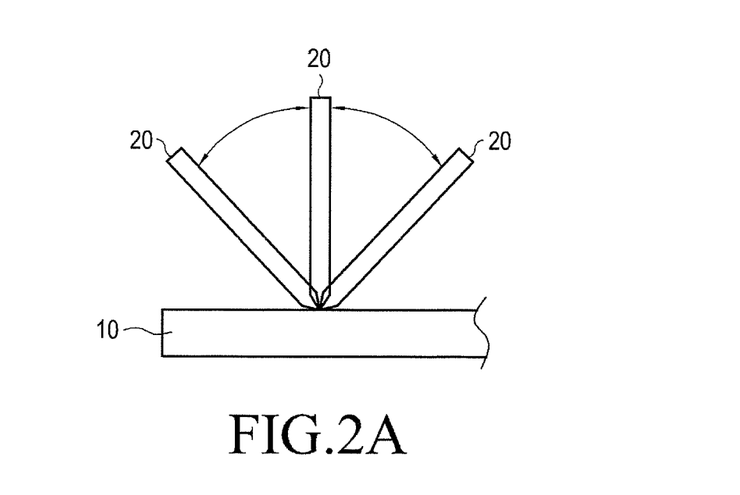
FIGS. 2A and 2B are diagrams illustrating a contact state of an electronic pen and a resonance frequency change state of a corresponding input sensing signal in a touch screen device according to one embodiment of the present disclosure.
Figure 2B:
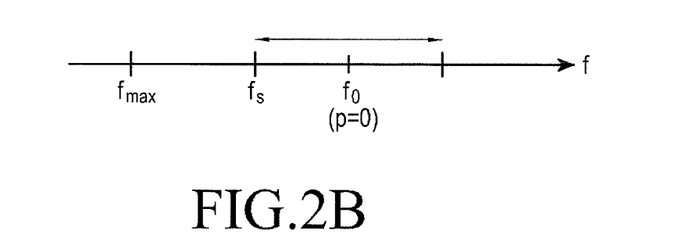

FIGS. 2A and 2B are diagrams illustrating a contact state of the electronic pen 20 and a resonance frequency change state of a corresponding input sensing signal in the touch screen device according to the present disclosure, respectively. Although in FIG. 2A, the electronic pen 20 is illustrated as contacting the EMR sensing panel 10 for convenience, in an actual use environment, the electronic pen 20 contacts a window which forms an outer layer of the touch screen of the portable terminal 1.

Referring to FIG. 2A, when the tip of the electronic pen 20 that contacts the EMR sensing panel 10 approaches in proximity to or contacts the EMR sensing panel 10, the electronic pen 20 can be perpendicular to the EMR sensing panel 10, but generally, the electronic pen 20 contacts the touch screen while being held by the user's hand, such that the electronic pen 20 usually approaches in proximity to or contacts the EMR sensing panel 10 while being inclined slightly.

Referring to FIG. 2B, in a manufacturing process of the touch screen, a resonance frequency (input sensing signal) in a maximum proximity state of the electronic pen 20 prior to contact (that is, a contact pressure p=0) can be measured for each particular position on the touch screen and the measured resonance frequency can be set to a reference frequency $f_0$. In this case, the reference frequency $f_0$ is set for a case where the electronic pen 20 is perpendicular to the touch screen, and considering a change of the resonance frequency according to an inclination of the electronic pen 20 in an actual use environment, a proper reference frequency band is provided with respect to the reference frequency $f_0$ as indicated by an arrow illustrated in FIG. 2B.

When the electronic pen 20 is in a contact state with respect to the touch screen, the resonance frequency changes and the touch screen determines whether the changed resonance frequency of the electronic pen 20 is out of a preset threshold value $f_s$ (that is, the changed resonance frequency is out of a provided reference frequency band), thus determining whether the electronic pen 20 contacts the touch screen. In this case, the resonance frequency changed corresponding to an increase of the contact pressure of the electronic pen 20 can be changed up to a preset maximum value $f_{max}$.

Figure 3A:
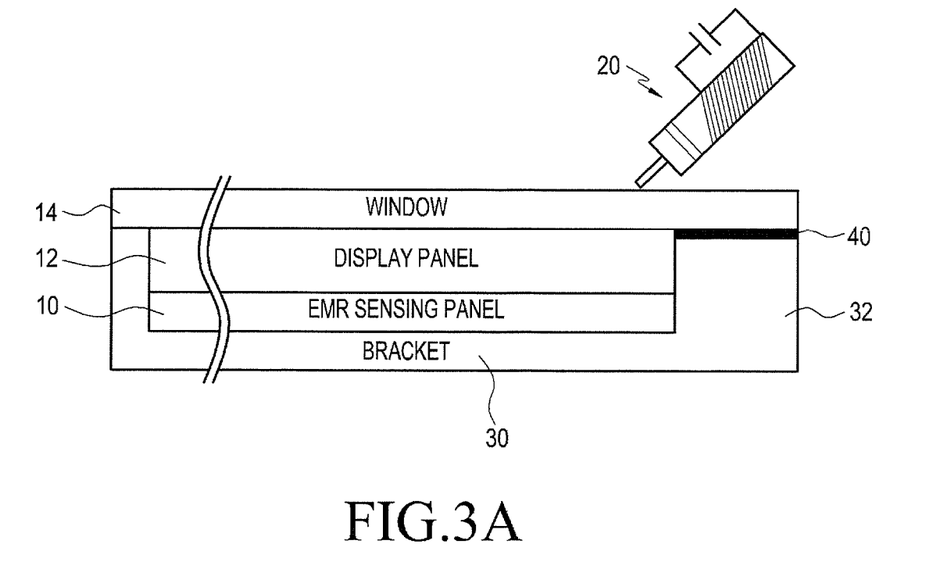
FIGS. 3A and 3B are cross-sectional views cut along a line A-A' of FIG. 1.
Figure 3B:
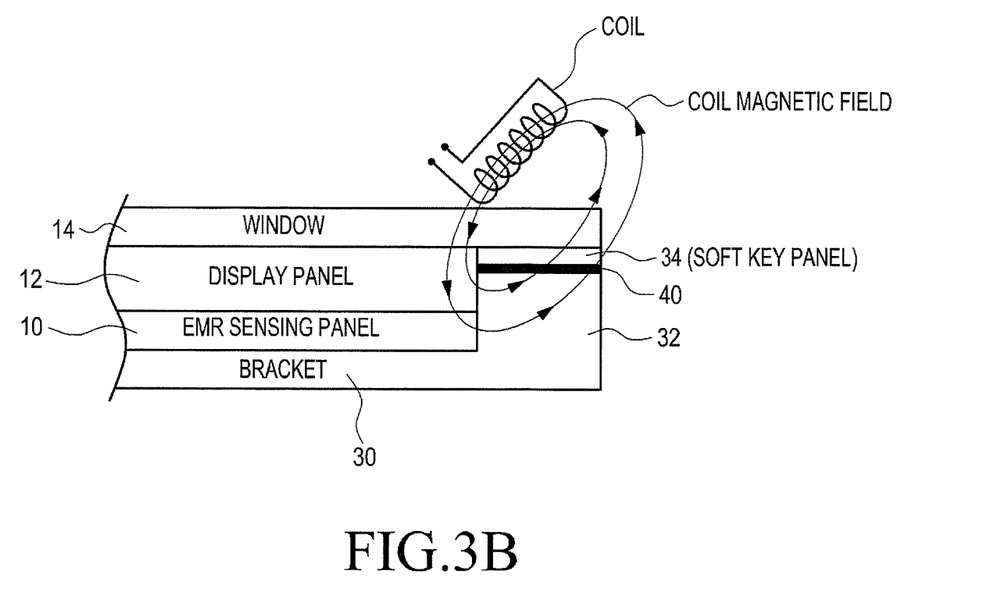

FIGS. 3A and 3B are cross-sectional views cut along a line A-A' of FIG. 1. In comparison to FIG. 3A, in FIG. 3B, a soft key panel 34 is installed on the extension portion 32 of the bracket 30 illustrated in FIG. 1. Also in FIG. 3B, the electronic pen 20 is illustrated by being simplified as a coil. Referring to FIGS. 3A and 3B, unlike when the electronic pen 20 is located in a relatively center region of the touch screen, the resonance frequency is affected by the bracket 30 in a region near the bracket 30 formed of a non-magnetic conductor in an edge of the touch screen. Although the resonance frequency is not affected much when the electronic pen 20 is perpendicular to the touch screen, the resonance frequency generated by the electronic pen 20 is significantly changed by the extension portion 32 because the electronic pen 20 is close to the extension portion 32 of the bracket 30 when the electronic pen 20 is used in a state of being inclined toward an outer side of the touch screen.

As illustrated in more detail in FIG. 3B, when a magnetic field is applied to a non-magnetic conductor such as the bracket 30, eddy current is generated in the non-magnetic conductor. The eddy current generates a magnetic field in an opposite direction to the applied coil magnetic field, thus generating an eddy magnetic field, such that the eddy magnetic field and the coil magnetic field offset each other and thus are reduced. This phenomenon reduces an L value in the LC resonance circuit of the main resonance circuit 24 of the electronic pen 20, thus increasing the resonance frequency of the LC resonance circuit.

In a scheme which senses a resonance frequency generated in the electronic pen 20 to sense a contact pressure applied to the electronic pen 20, the change of the L value occurring due to approach to surrounding conductive metal makes it difficult to determine whether the electronic pen 20 is in a contact state or a proximity approach (hovering) state and to determine a level of the contact pressure.

The extension portion 32 is necessarily required in a lower right portion of the bracket 30 with respect to the posture of the portable terminal 1. The electronic pen 20 is usually inclined toward the extension portion 32 when the electronic pen 20 is used by the user, such that at a corresponding position, the change of the resonance frequency generated in the electronic pen 20 occurs almost at all times.

Therefore, in the embodiment, the frequency compensating plate 40 formed of a soft magnet is installed on the extension portion 32 of the bracket 30. The soft magnet having high permeability increases an L value as it is in proximity with the inductor of the electronic pen 20. In the embodiment of the present disclosure, by using this feature, the frequency compensating plate 40 formed of the soft magnet is installed in a region much affected by the conductor of the bracket 30, that is, in the extension portion 32, thus offsetting the influence of the conductor of the bracket 30 and the influence of the soft magnet upon the LC resonance circuit of the electronic pen 20, such that stable resonance frequency characteristics can be secured.

The soft magnet which forms the frequency compensating plate 40 can use an alloy thin film such as a Fe—Si steel plate in which silicon (Si) is mixed based on iron (Fe), or can use a Fe-based amorphous film.

Referring to FIGS. 3A and 3B, an internal interlayer structure of the touch screen device includes the EMR sensing panel 10 for sensing an input from the electronic pen 20, a display panel 12 which is installed on a top layer portion of the EMR sensing panel 10 receives a control signal or graphic signal from outside with an image pixel array structure such as an AMOLED and displays a corresponding image, a window 14 installed on the top layer portion of the display panel 12 and formed of tempered glass that forms an outer layer of the touch screen, and the bracket 30 in the form of a plate which supports and protects at least the EMR sensing panel 10 and the display panel 12. In addition, a Printed Circuit Board (PCB, not shown) on which various electric or electronic circuits of the touch screen (or the portable terminal 1) are disposed can also be installed under the EMR sensing panel 10 or under the bracket 30.

In this case, the extension portion 32 of the bracket 30 has a higher height than other portions of the bracket 30 by protruding to the installation position of the display panel 12 to support sides of the EMR sensing panel 10 and the display panel 12.

Figure 4:
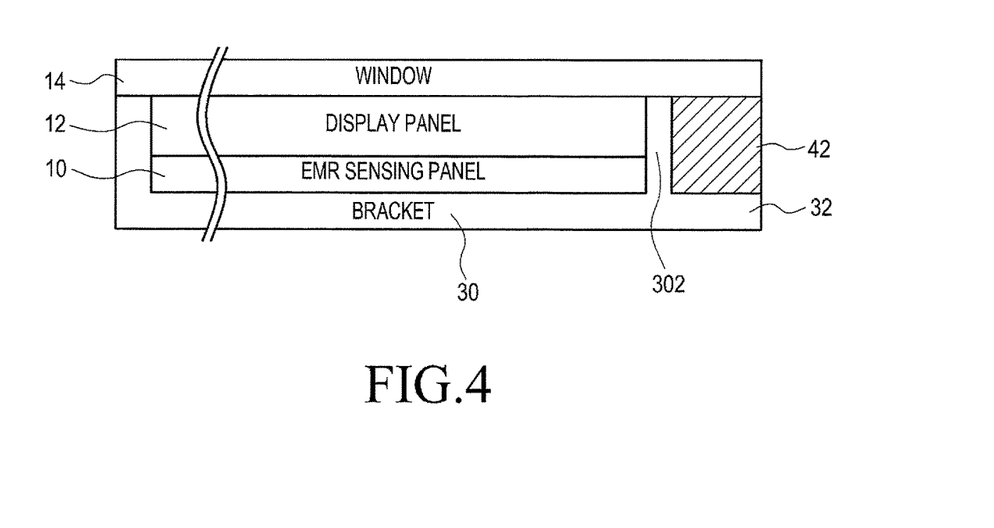
FIG. 4 is a structural diagram illustrating a touch screen device having a structure for compensating for distortion of an input signal according to another embodiment of the present disclosure.

FIG. 4 is a structural diagram illustrating a touch screen device having a structure for compensating for distortion of an input signal according to another embodiment of the present disclosure. Referring to FIG. 4, like the structure of the embodiment illustrated in FIGS. 3A and 3B, an internal interlayer structure of the touch screen device according to another embodiment of the present disclosure includes the EMR sensing panel 10 for sensing an input from the electronic pen 20, the display panel 12 which is installed on a top layer portion of the EMR sensing panel 10 and displays an image with an image pixel array structure such as an AMOLED, the window 14 which is installed on the top layer portion of the display panel 12 and forms an outer layer of the touch screen, and the bracket 30 in the form of a plate which supports and protects at least the EMR sensing panel 10 and the display panel 12.

In this structure, the extension portion 32 of the bracket 30 has a height equal to that of the bracket 30 in the form of a plate, such that the extension portion 32 does not protrude toward the EMR sensing panel 10 and the display panel 12. That is, the structure according to another embodiment illustrated in FIG. 4 is such that the extension portion 32 and the electronic pen 20 are sufficiently spaced apart from each other and thus the electronic pen 20 is not affected.

A sidewall structure 302 for stably supporting the sides of the EMR sensing panel 10 and the display panel 12 is integrally formed in the bracket 30. Moreover, the sidewall structure 302 allows a cross-sectional structure of the bracket 30 to be overall in the shape of '[', thus satisfying firmness structurally required for the bracket 30. The sidewall structure 302 can have a thin thickness to minimize the influence of the bracket 30 upon the LC resonance circuit of the electronic pen 20.

An insulator 42 formed of a plastic material is installed on the extension layer 32 of the bracket 30 not to affect the electronic pen 20 while supporting installation of a hard key, a soft key, or a part provided in the portable terminal 1.

Figure 5:
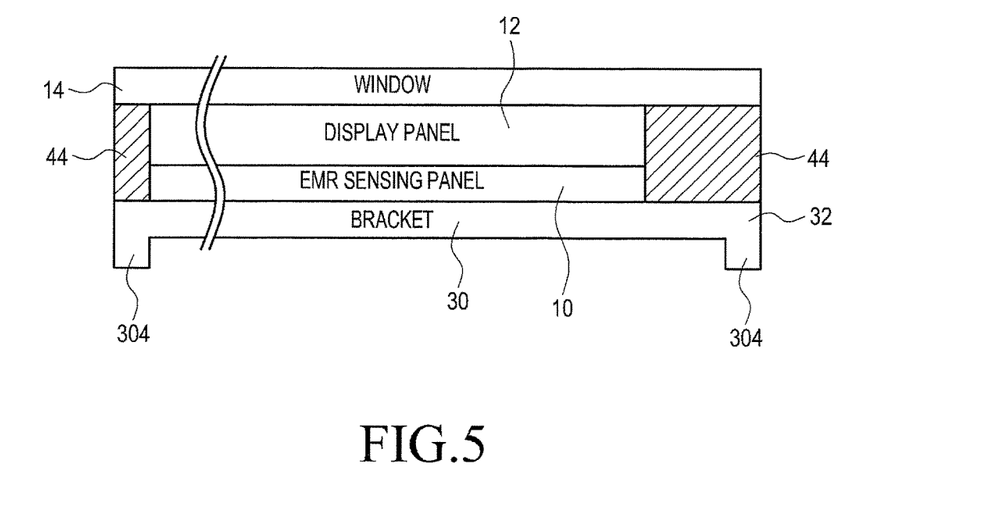
FIG. 5 is a structural diagram illustrating a touch screen device having a structure for compensating for distortion of an input signal according to yet another embodiment of the present disclosure.

FIG. 5 is a structural diagram illustrating a touch screen device having a structure for compensating for distortion of an input signal according to yet another embodiment of the present disclosure. Referring to FIG. 5, an internal interlayer structure of the touch screen device according to another embodiment is similar to that of the touch screen device according to another embodiment illustrated in FIG. 4, except that a sidewall structure for stably supporting the sides of the EMR sensing panel 10 and the display panel 12 is not provided in the bracket 30 and an insulator 44 formed of a plastic material is installed on the bracket 30 to support the sides of the EMR sensing panel 10 and the display panel 12. The insulator 44 is installed on a corresponding portion on the extension portion 32 of the bracket 30. That is, in the structure illustrated in FIG. 5, the sidewall structure 302 for supporting the sides of the EMR sensing panel 10 and the display panel 12 is removed when compared to the structure illustrated in FIG. 4, thus not affecting the electronic pen 20 more than the structure illustrated in FIG. 4.

Also in this case, to satisfy firmness required for the bracket 30, the sidewall structure 304 that protrudes downwardly can be provided integrally on the side of the bracket 30 in the form of a plate. The sidewall structure 304 allows the cross-sectional structure of the bracket 30 to be overall in the shape of '[', like in the structure according to another embodiment illustrated in FIG. 4.

As is apparent from the foregoing description, the touch screen device having the structure for compensating for distortion of an input signal compensates for distortion of an input sensing signal, thereby more accurately sensing an input.

The touch screen device having the structure for compensating for distortion of an input sensing signal according to the embodiments of the present disclosure can be structured as described above, and while detailed embodiments have been described in the foregoing description of the present disclosure, various modifications can be made without departing from the scope of the present disclosure.

Although the present disclosure has been described with an exemplary embodiment, various changes and modifications can be suggested to one skilled in the art. It is intended that the present disclosure encompass such changes and modifications as fall within the scope of the appended claims.

What is claimed is:

1. A device with a touch screen, comprising:
   an Electromagnetic Resonance (EMR) sensing panel configured to sense an input from an electronic pen, the input associated with a magnetic field of a resonance frequency generated in the pen by the EMR sensing panel;
   a display panel installed on a top layer portion of the EMR sensing panel, configured to receive a control signal or graphic signal, and display a corresponding image;
   a bracket formed in a form of a plate beneath the EMR sensing panel, the bracket comprising:
     an installation portion configured to accommodate a bottom and sides of the EMR sensing panel; and
     an extension portion that extends from a side of the installation portion and that forms a flat surface at a top end, wherein a height of the flat surface of the extension portion is higher than that of the EMR sensing panel, and wherein the flat surface is substantially parallel with the display panel; and
   a frequency compensating plate substantially parallel with the display panel, the frequency compensating plate formed of a soft magnet offsetting a change in the resonance frequency generated in the pen by the extension portion of the bracket, the frequency compensating plate disposed to cover the flat surface of the extension portion substantially parallel with the display panel, the frequency compensating plate positioned higher than the EMR sensing panel, the frequency compensating plate positioned apart from the EMR sensing panel, and the frequency compensating plate installed under a transparent layer that forms an outer layer of the touch screen.

2. The device of claim 1, wherein the extension portion is formed on at least one of an upper, lower, or edge portion of the bracket.

3. The device of claim 2, wherein the soft magnet is an alloy thin film in which silicon (Si) is mixed based on either iron (Fe) or a Fe-based amorphous film.

4. The device of claim 1, wherein the EMR sensing panel comprises substantially orthogonal multiple loop coil patterns, each of loop coil pattern configured to generate a magnetic field of a preset resonance frequency.

5. The device of claim 4, wherein the multiple loop coil patterns are sequentially selected to repeat an AC power for forming a magnetic field.

6. The device of claim 5, wherein the multiple loop coil patterns are configured to detect a resonance frequency of the electronic pen.

7. device of claim 6, wherein each of the multiple loop coil patterns is configured to output a sensing signal to detect the electronic pen.

8. device of claim 1, wherein the extension portion comprises either a hard key having a physical press key structure or a soft key having a touch input structure.

9. The device of claim 1, wherein a display window glass is positioned upon the display panel and the frequency compensating plate.

10. The device of claim 1, wherein a soft key panel is positioned upon the display panel and the frequency compensating plate.

11. The device of claim 1, wherein a display window glass is positioned on the display panel and a soft key panel.

* * * * *